United States Patent Office 2,758,090
Patented Aug. 7, 1956

2,758,090

STABILIZATION OF FERRATES

John R. Mills, Niagara Falls, N. Y., and William C. Smith, Urbana, Ill., assignors to E. I. du Pont de Nemours & Company, Wilmington, Del., a corporation of Delaware No Drawing. Application June 5, 1953, Serial No. 359,879

10 Claims. (Cl. 252—186)

This invention relates to metallic ferrates and more particularly to means for stabilizing these materials so that they can be used as oxidizing agents.

The ferrate ion, $FeO_4^=$, in which iron exhibits a valence of six, is one of the most powerful oxidants known. Heretofore, however, compounds containing this ion have not been used to any extent industrially and have, in fact, not often been made deliberately. Formation of ferrates as oxidation by-products in reactions of iron-containing compounds has frequently been reported in the literature, but the preparation of materials containing high percentages of ferrate has only been accomplished in the last few years. The first fundamental studies of the chemistry of these unusual compounds have been reported quite recently as, for example, by Thompson et al., J. Am. Chem. Soc., 73, 1379 (1951).

While solid ferrates have found some utility, for example as Fischer-Tropsch catalysts, U. S. P. 2,455,696, the solutions of the materials which would be required for use as oxidizing agents have rarely been prepared. The solutions can, nevertheless, be employed to bleach vegetable fibers, cotton in particular, and to effect certain organic reactions such as the oxidation of mandelic to benzoic acid and of alcohol to acetic acid. In addition they can oxidize sulfurous acid, nitrites, ferrocyanides and like inorganic compounds. Ferrates may also be used for the treatment of municipal water supplies and the destruction of oxidizable material in aqueous wastes.

Perhaps a major factor retarding both the production of ferrates and the industrial utilization of the compounds as oxidizing agents is their marked instability in solution. Potassium ferrate, for instance, a typical representative of the ferrates, can be precipitated from strongly alkaline solutions as dark colored crystals which are relatively stable when dry and remain apparently unchanged if exposed to the atmosphere for twenty-four hours. The solid can furthermore be stored in a desiccator for prolonged periods without evidence of change. If, however, potassium ferrate is dissolved in water of a pH less than about 12, it decomposes rapidly with liberation of oxygen and simultaneous deposition of hydrated ferric oxide. The ferrate ion gives an intense red color in aqueous solution, a 0.0003 molar solution being much more strongly colored than a permanganate solution of the same molarity. Decomposition of the solute can therefore conveniently be followed photometrically, although the colored ferric ion affords some interference. When the solid ferrate is treated with an aqueous acid an extremely rapid, in some cases almost instantaneous, reaction occurs, with accompanying gas evolution, presumably according to the equation:

$$4FeO_4^= + 20H^+ \rightarrow 4Fe^{+++} + 3O_2 + 10H_2O$$

Schreyer et al., Anal. Chem. 23, 1312 (1951) have discussed the stability of ferrate solutions in some detail.

A primary object of this invention is to develop a method for stabilizing ferrates. Another object of the invention is development of a method for stabilizing ferrates in aqueous solution. A further object is development of a method for stabilizing ferrates in neutral or mildly alkaline solution. A still further object of the invention is development of a method for stabilizing ferrates so that these compounds may be used as oxidizing agents.

The above-mentioned and other objects of the invention may be achieved by adding certain phosphates to a solution containing the ferrate ion. All phosphates are not suitable for this purpose, pyrophosphate, for example, actually catalyzing the decomposition of the oxidant. Orthophosphates and metaphosphates, on the other hand, provide a marked stabilization effect. Concentration of the stabilizing compound employed is not critical but for best results a ferrate:phosphate ratio of about 1:1 is preferred. Higher values of phosphate sometimes give worse results than are obtained with the 1:1 ratio but can be used. The mole ratio should not be more than 20:1 ferrate:phosphate if any stabilization is to be obtained. Temperature is not too critical, ambient or normal room temperatures being quite satisfactory. Since, however, an increase in temperature hastens the decomposition of the ferrate, elevated temperatures should be avoided as far as possible. Details of the invention may be seen from the examples which follow and from the appended drawing, in which:

The figure illustrates diagrammatically the stabilizing effect of the orthophosphate ion on the ferrate ion at several concentrations.

EXAMPLE 1

(a) Potassium ferrate, samples of which were utilized in this and in succeeding examples, was made up after a modification of the preparation and purification procedure of Thompson et al., loc. cit. The reactions involved may be represented by the following equations:

(1) $Cl_2 + 2NaOH \rightarrow NaOCl + NaCl + H_2O$ (2) 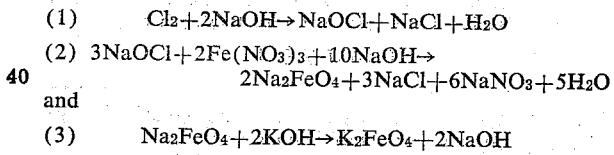

and (3) $Na_2FeO_4 + 2KOH \rightarrow K_2FeO_4 + 2NaOH$

One hundred twenty grams of sodium hydroxide was dissolved in 300 ml. of distilled water and the solution cooled to 0° C. and chlorinated at less than 5° C. Chlorination was continued until the weight of the solution had increased by 80 grams. Two hundred eighty grams of solid sodium hydroxide was added to the solution with vigorous stirring, the temperature being permitted to rise to about 20° C. The mixture was again cooled to 0° C. and filtered.

One hundred grams of ferric nitrate, $Fe(NO_3)_3 \cdot 9H_2O$, was added slowly and with constant stirring to the cooled alkaline hypochlorite solution. One hundred grams of solid sodium hydroxide was then added to the solution, the temperature being kept below 10° C. The cold mixture was filtered and 400 ml. of saturated potassium hydroxide added to the filtrate, the temperature again being held at 10° C. or below. The mixture was stirred for a few minutes and filtered, the filtrate being discarded. The precipitate was leached with 3 N potassium hydroxide into a saturated potassium hydroxide solution. More of the saturated caustic potash was added to the dissolved ferrate, the solution cooled to 0° C. and filtered. The dark crystalline potassium ferrate product remaining on the filter was washed with absolute alcohol, slurried with additional alcohol, filtered again, rinsed with diethyl ether and dried.

Several ferrate preparations were carried out by the process described with a maximum yield of about 59%. This low yield was due largely to incomplete reaction, solubility of potassium ferrate even at the very high pH employed and partial decomposition of the product. The ferrate crystals were rectangular plates, dark red to violet in reflected light and red in transmitted light.

(b) A 0.002 M solution of potassium ferrate in saturated potassium hydroxide was prepared. This solution did not change when allowed to stand overnight and was completely free of any precipitate after standing for twenty-four hours at room temperature.

(c) A solution 0.002 M in potassium ferrate and 3 M in potassium hydroxide was made up. The solution had completely lost its red color after one-half hour in an ice bath followed by three hours standing at room temperature.

EXAMPLE 2

An experiment was run to determine the stabilizing effect of 0.1 M pyrophosphate on 0.0003 M potassium ferrate at a pH of 9.85. The ferrate color was completely discharged in a few minutes.

EXAMPLE 3

A series of runs was made in which 0.0003 M potassium ferrate solutions were stabilized at room temperature by addition thereto of various concentrations of orthophosphate ion, the initial pH being 8.95 in each case. The results are shown by the figure where the "Elapsed time in minutes" is plotted against the "Optical density," the quantity log (1/percent T) or the logarithm of the reciprocal of percentage transmittance (T) of light through the solution. The interpretation of the data is believed self-evident. It will be observed that orthophosphate, unlike pyrophosphate, is an effective stabilizing agent and, further, that low orthophosphate concentrations are more effective than larger amounts. In the case of the concentrations plotted the optical density of the solution 0.10 molar in orthophosphate was 16.8 seventeen and one-half hours after the solution was mixed while the optical density of the solution containing 0.001 M orthophosphate was 33.7 after about twenty-four hours. The color of the 0.5 M orthophosphate solution was completely discharged in about twelve hours.

EXAMPLE 4

Another series of runs was made to determine the influence of hydrogen ion concentration on the effectiveness of the orthophosphate stabilizing agent.

(a) A sodium phosphate buffer of pH 6.2 and a molarity of 0.1 in combined phosphate from $NaH_2PO_4 \cdot H_2O$ and $Na_2HPO_4 \cdot 7H_2O$ was prepared. To this buffer was added potassium ferrate to make up a dilute (0.0003 M) solution of the latter. The color of the ferrate was discharged before the volume could be properly adjusted.

(b) A solution of pH 7 was prepared 0.10 M in orthophosphate and 0.0003 M in potassium ferrate. In three minutes gas evolution had ceased but there was only a slight ferrate coloration left. In four minutes the solution had assumed a yellowish tint but still retained a faint pink tinge.

(c) To another solution 0.1 molar in phosphate buffered to pH 11.57 was added potassium ferrate to form a 0.0003 M solution as before. The characteristic color of ferrate appeared but in six minutes had faded.

(d) Thirty-eight grams (0.1 mole) of sodium orthophosphate, $Na_3PO_4 \cdot 12H_2O$, was dissolved in distilled water and the total volume brought up to one liter. The pH of the solution was 12 but was reduced with hydrochloric acid to 9.85. A 0.0003 M solution of potassium ferrate was made up from this buffer. The optical density of the solution was 65 six and one-half minutes after mixing and had fallen to 52.6 after thirty-five and one-half minutes.

(e) A 0.0003 M potassium ferrate solution was made 0.1 molar in orthophosphate at a pH of 8.50. A very slight pink color was still visible in the solution about sixteen hours later.

(f) A 0.0003 M potassium ferrate solution was made 0.05 molar in orthophosphate at a pH of 8.95. This solution exhibited a very strong red color at the end of about sixteen hours.

The date of this example show a preferred pH range for stabilization of ferrates by orthophosphates between about 8 and 10, with a definite optimum value around 8.95–9.

EXAMPLE 5

A series of runs was made to determine the effect of time and temperature on 0.10 M potassium ferrate stabilized with 0.1 M orthophosphate at a pH of 8.95. The solution was buffered with 0.1 M sodium borate. The buffer was made up adding sodium hydroxide to boric acid in solution to the proper pH. Results are shown in Table I. The percentage of ferrate remaining was determined by means of an electrophotometer.

Table I.—Decomposition of 0.1 M $K_2FeO_4$ stabilized with orthophosphate

| Time from Beginning | | Percentage of Original Ferrate Remaining | | |
|---|---|---|---|---|
| Hours | Minutes | 25° C. | 49° C. | 98° C. |
|  | 5 |  | 100 | Color gone in 3–4 minutes. No readings taken. |
|  | 20 |  | 78.3 | |
|  | 25 | 100 |  | |
|  | 53 |  | 78.8 | |
|  | 57 | 100 |  | |
| 1 | 28 |  | 77.2 | |
| 18 | 55 | 71.7 | | |
| 20 | 24 | Ferrate color discharged | | |

It will be noted that the solution remains stable at room temperature for several hours and then quite suddenly decomposes.

EXAMPLE 6

The experiment of Example 5 was repeated except that a 0.01 M potassium ferrate solution stabilized with orthophosphate and buffered with borate in a 1:1:1 molar ratio was utilized. Results are shown in Table II.

Table II.—Decomposition of 0.01 M $K_2FeO_4$ stabilized with orthophosphate

| Time from Beginning | | Percentage of Original Ferrate Remaining | | |
|---|---|---|---|---|
| Hours | Minutes | 25° C. | 49° C. | 98° C. |
|  | 2 |  |  | 100 |
|  | 3 |  | 100 |  |
|  | 10 |  | 95 |  |
|  | 11 |  |  | 46.5 |
|  | 16 |  |  | 44.2 |
|  | 21 |  | 91.4 |  |
|  | 24 | 100 |  |  |
|  | 25 |  |  | 14 |
|  | 30 |  | 89 |  |
| 1 | 24 |  | 74.7 |  |
| 1 | 40 | 99.2 |  |  |
| 2 | 5 |  | 62.7 |  |
| 2 | 50 | 96.5 |  |  |
| 3 | 5 |  | 27.4 |  |
| 5 | 7 |  | 28.1 |  |
| 5 | 45 |  | 22.3 |  |
| 20 | 20 | 65.2 |  |  |
| 22 |  | Color discharged | | |

The decomposition follows the same pattern as that observed in Example 5, i. e. the solution is quite stable at room temperature for a long period of time and then suddenly decomposes.

EXAMPLE 7

Qualitative experiments were made with several additional phosphates to determine their effect in stabilizing potassium ferrate. In each case a 1:1:1 molar ratio of 0.1 M ferrate:phosphate:borate was employed at a pH of around 8.95.

(a) Sodium triphosphate, $Na_5P_3O_{10}$, was found to be almost as effective as orthophosphate.

(b) "Cyclofos," a material described as tetrametaphosphate, a cyclic tetramer $(NaPO_3)_4$, was found to have good stabilizing action. However, another material also described as a sodium tetrametaphosphate was found to have no stabilizing action.

(c) The cyclic trimer sodium trimetaphosphate did not exhibit any stabilizing action.

(d) "Quadrofos," a commercial product described as sodium tetraphosphate, $Na_6P_4O_{13}$, gave good results. This "compound" is chiefly a mixture of sodium triphosphate and metaphosphate.

(e) Results with metaphosphate glasses varied depending apparently on the method used in producing the glass. Some showed very good stabilizing action while others showed none at all. This fact is not too surprising when it is considered that the composition of the glass itself varies with the method of production.

Various modifications can be made without departing from the spirit of the invention. Operative soluble phosphates of the alkali metals in general, for example, can be used instead of those of sodium alone. Potassium salts are obvious substituents. In like manner other ferrates can be used instead of potassium ferrate. The primary requirements for such ferrates are that they be fairly stable and soluble in water. About the only ferrates satisfying these two conditions are those of the alkali and alkaline earth metals such as sodium and calcium.

Concentrations need not be exactly those shown. Concentrations of the ferrate ion up to the limit of its solubility can be employed, if desired, but instability may increase with concentration. Maximum stability seems to exist in solutions around, or at least not greater than, 0.01 M in ferrate. A 1:1 molar ratio of ferrate:orthophosphate should be used for best results although ratios of 20:1 may still afford some protection to the oxidant. Ratios of less than 1:1 give impaired results but also afford some protection. The optimum ratio can be expected to vary somewhat with concentration since stabilization effectiveness probably depends on ionic strength, but in general the 1:1 ratio is preferred.

Various buffering agents may also be used. Phosphate and borate are shown but others may be used as well. Care must be taken, however, that those organic materials which are easily oxidized by the ferrate are avoided. Concentration of the buffer should be calculated for the optimum pH by known methods.

It will readily be understood that this invention, in its broader aspects, is not restricted to the solutions discussed above but embraces as well the mixed solids from which those solutions may be prepared. For some purposes it may be convenient to package and sell ready mixed powders of the proper composition. Since the preferred embodiment of the invention includes a mixture of ferrate and phosphate of mole ratio 1:1, a solid mixture of these ingredients in the mole proportions of 1:1 is part thereof.

Potassium ferrate is the preferred ferrate but the sodium and other soluble and stable ferrates can be used also. In general the phosphate used will consist of sodium phosphate but, as noted, other water soluble alkali or alkaline earth phosphates can be used as well. The exact formula of the phosphate employed is also subject to some variation. Thus trisodium, disodium and monosodium orthophosphates or mixtures thereof are equally acceptable. The mole ratio must be calculated from the phosphate ion concentration. Other operative phosphates can of course be substituted for the orthophosphates as, for example, triphosphates and some of the metaphosphates.

The molar ratio of the stabilizing phosphate can also be varied from the preferred 1:1 value to the usable 1:20 phosphate:ferrate ratio. An excess of phosphate, making a ratio of say 2:1 can be used but, since best results are obtained with lower phosphate values, the latter are preferred. The solid phosphate mixtures may also contain a buffering agent to protect against excess acidity. The preferred agents, because of their stability and general compatibility, are the sodium borates. Other buffer concentrations and, in fact, other stable buffers can of course be substituted for those given as will be understood. An equimolar mixture of ferrate, phosphate and borate is, however, preferred.

Having described our invention, we claim:

1. The method of stabilizing an aqueous solution of potassium ferrate which comprises incorporating therein a sodium orthophosphate in a ferrate:phosphate ratio of between 1:2 and 20:1 and at a pH between 8 and 10.

2. The method of stabilizing an aqueous solution of potassium ferrate which comprises incorporating therein a sodium orthophosphate in a ferrate:phosphate ratio of about 1:1 and at a pH of about 8.95–9.

3. The method of claim 2 in which the pH is maintained by a borate buffer.

4. An aqueous solution of potassium ferrate at a pH between about 8 and 10 containing a stabilizing quantity of the orthophosphate ion, the mole ratio of ferrate: phosphate in said solution being between about 1:2 and 20:1.

5. A stabilized aqueous solution of a member of the group consisting of alkali and alkaline earth metal ferrates at a pH of around 9 containing the orthophosphate ion in a ferrate:phosphate ratio of about 1:1.

6. The solution of claim 5 in which the pH is maintained by a borate buffer.

7. A solid composition of matter comprising a mixture of potassium ferrate and sodium orthophosphate in a mole ratio of about 1:1.

8. An aqueous solution of a member of the group consisting of alkali and alkaline earth metal ferrates having a pH of 8–10 and containing ferrate, orthophosphate and borate ions in a mole ratio of about 1:1:1.

9. A solid composition of matter consisting essentially of (1) a water-soluble, stable member of the group consisting of the ferrates of the alkali and alkaline earth metals and (2) a water-soluble phosphate chosen from the group consisting of orthophosphates, non-cyclic triphosphates, and tetraphosphates, the mole ratio of ferrate:phosphate in said composition being between about 1:2 and 20:1.

10. A solid, water-soluble composition of matter comprising essentially (1) a stable member of the group consisting of the ferrates of the alkali and alkaline earth metals, (2) an orthophosphate and (3) a borate, the ferrate:orthophosphate:borate mole ratio in said composition being about 1:1:1.

References Cited in the file of this patent

Schreyer et al.: "Analytical Chemistry," vol. 23, pages 1312–1314, September 9, 1951.